United States Patent [19]
Pohl

[11] Patent Number: 6,064,421
[45] Date of Patent: May 16, 2000

[54] COMMUNICATIONS DEVICE WITHIN A DOLL

[76] Inventor: Dirk Pohl, Koloniestrasse 157, D47057, Duisburg, Germany

[21] Appl. No.: 09/113,205

[22] Filed: Jul. 10, 1998

[30] Foreign Application Priority Data

Jul. 10, 1997 [DE] Germany .......................... 197 29 508

[51] Int. Cl.⁷ .................................................. H04N 7/14
[52] U.S. Cl. ................. 348/14; 379/102.01; 379/102.02
[58] Field of Search ................. 348/14, 61, 143; 379/102.01, 102.02, 102.03, 93.17, 93.19, 93.23; 446/268, 298, 72, 81; 463/41; 901/8

[56] References Cited

U.S. PATENT DOCUMENTS

| | | | |
|---|---|---|---|
| 5,142,803 | 9/1992 | Lang .......................................... | 348/61 |
| 5,612,734 | 3/1997 | Nelson et al. .............................. | 348/20 |
| 5,644,628 | 7/1997 | Schwarzer et al. ................... | 379/93.19 |
| 5,738,526 | 4/1998 | Cerda et al. ............................. | 434/364 |
| 5,746,602 | 5/1998 | Kikinis ..................................... | 446/298 |

FOREIGN PATENT DOCUMENTS

| | | |
|---|---|---|
| 295 11 697 U1 | 7/1995 | Germany . |
| 196 03 483 C2 | 1/1996 | Germany . |
| 196 37 854 A1 | 9/1996 | Germany . |
| 405237269A | 9/1993 | Japan .............................. A63H 30/12 |

OTHER PUBLICATIONS

*Die zweite Handy–Welle,* In: Funkschau, Aug. 1997, pp. 80–85.

*Das erste Videophon–Handy,* In: Funkschau, Jan. 1991, p. 21.

Guillemin, Pierre, *Communication in the household,* In: TR Technische Rundschau, No. 17, 1997, pp. 24–2.

*Primary Examiner*—Curtis A. Kuntz
*Assistant Examiner*—Melur Ramakrishnaiah
*Attorney, Agent, or Firm*—Hutchins Wheeler & Dittmar

[57] ABSTRACT

The invention concerns a communications device incorporated into a doll-like figure with at least one microphone, at least one speaker and communications module for exchange of data with a digital data network. The invention thus proceeds from a digital telephone, preferably a videophone. The invention creates a communications device suitable for recording and reproducing other signals in addition to conventional data, particularly sound signals. The doll-like figure containing the communications device has a base body with at least one moving part attached to the base body, and at least one adjusting motor for driving the part. The motor is controlled by a control device which receives control signals via the communications module from the data network. A movement sensor may be provided which detects a manual adjusting movement of the moving part and which is connected to the data network with a data line, thereby permitting the movement signals to be transmitted as control signals to the data network.

27 Claims, 1 Drawing Sheet

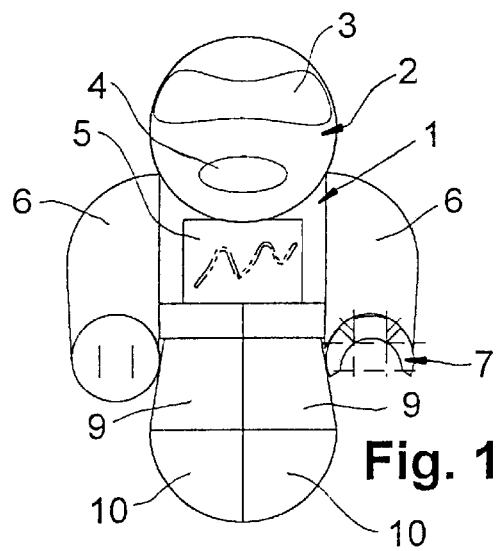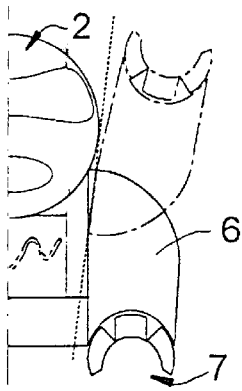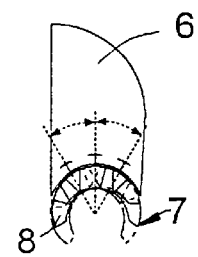
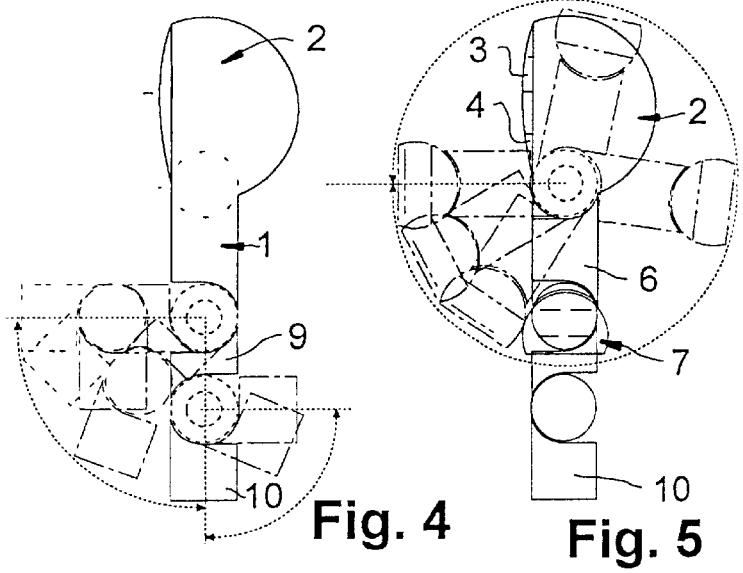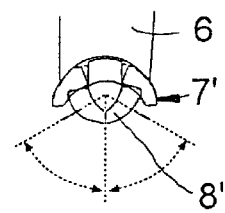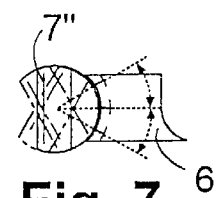
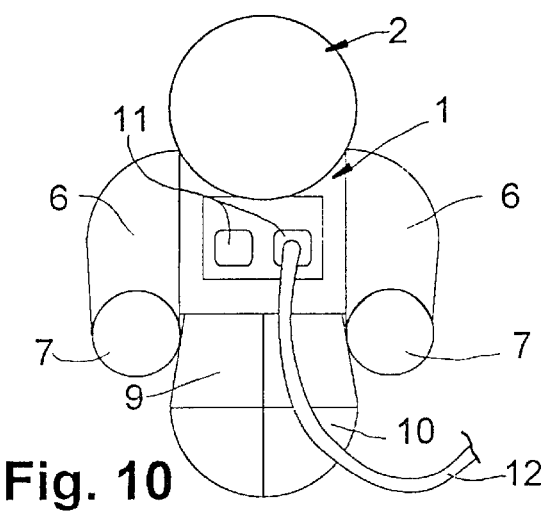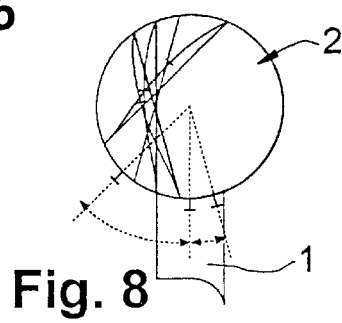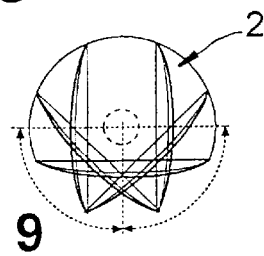

COMMUNICATIONS DEVICE WITHIN A DOLL

FIELD OF THE INVENTION

The invention concerns a communications device within a doll-like figure with at least one microphone, at least one speaker, and a communications module for the exchange of data with a digital data network.

SUMMARY OF THE INVENTION

The device according to the invention is a doll-like communications device constructed on a digital telephone, which records speech and tone data via a microphone, and introduces it to a digital data network via a communications module. From the network, the data can be transmitted to a second communications device, which reproduces by its speaker the sound signals recorded with the first communications device after converting the data to voltage signals. In the case of telephony, the communications device provides for communication between at least two devices, e.g., for communication of a first to a second device and from the second to the first device. The communications device of the invention is suitable for the recording and reproduction of other signals in addition to conventional data, particularly sound signals.

According to the invention, the communications device comprises a base unit with at least one moving part that is attached to the base unit, and at least one adjusting motor for driving the moving part. The motor is controlled by a control device which receives control signals from the data network via the communications module. Conventional and non-conventional sound signals thus can be introduced into the communications device for reproduction. It is also possible to introduce control signals from the data network which produce movement of the moving part relative to the base part.

Preferably, the communications device according to the invention is a videophone and further comprises at least one camera and at least one video screen.

In the case of a particularly preferred embodiment, a movement sensor which detects a manual movement of the moving part is connected to the moving part, and the movement signals detected by the sensor can be transmitted via the communications module as control signals to the data network, where they are further conducted to a second, similar communications device, which in its turn reconstructs the manually produced adjusting movement in the second device.

A particularly preferred embodiment of the communications device has the form of a doll comprising a head portion and a base body. The base body comprises two rotatable arm parts disposed laterally on the upper portion and on the lower portion, two leg parts attached in a moveable manner next to one another. In this embodiment, a display screen and speaker are integrated into the head part of the doll. A microphone and camera also are arranged preferably in the head part of the doll.

The display screen preferably is disposed in the eye region of the head part. When the display screen is arranged on the front side, one viewing the device sees the doll simultaneously directly with the eye as well as on the image transferred onto the display surface. If the display screen is placed on the back side of the head, the viewer has the impression of viewing the image transmitted onto the display screen through the head with the eyes of the doll. The speaker can be arranged in the mouth region of the doll, i.e., in the lower half of the head part.

The communications device according to the invention in the form of a doll makes possible common play back and forth between the persons operating the two or more communications devices connected with one another, in addition to conventional image and tone transmission. Any operation that one person transmits manually to his communications device may also be performed on the second communications device of the other person. If the other person stops the moved part of the second communications device, or moves this part in another direction, then two opposite-running signals are formed, whereby the resulting movements of the moving parts of the communications device will depend on the expenditure of force of the respective operating person. A disruption of the communications device will not occur if the drive is provided with safety clutches or overload circuits which deactivate the drives when a maximum driving force is reached.

Thus, in operation, if the operating person imagines himself inside the communication device, looks it in the eyes so to speak, and thus its image is transmitted to the second communications device, the optical axis of the camera should proceed to record the operating person through the center point of the display screen surface, which the operating person views. For this purpose, the display screen surface can be projected onto the optical axis of the camera by means of a partially reflecting mirror. The camera may lie invisibly behind the partially reflecting mirror surface and can further image the person who looks at the partially reflecting mirror surface.

In another embodiment, two display screens are used in one doll figure, which are arranged next to one another, whereby a stereo image pair can be transmitted to the eyes of the viewed person. The viewing person then sees a three-dimensional image in the communications device. It may be necessary for this purpose that the communications device which conducts the imaging has available two cameras arranged laterally next to one another as much as possible at a distance, substantially equal to that between the two eyes (about 6–7 cm). Sensors for determining the eye position relative to the display screens also may be provided. These control the imaging devices and the display screens in such a way that the optimal three-dimensional impression arises for the viewing person.

In one embodiment, two microphones for recording a stereo tone can be disposed laterally within the communications device, whereby the communications device reproducing the sound comprises two lateral speakers for stereo reproduction. The microphones and speakers may be contained in a single structural part with a vibrating diaphragm.

In order to endow the communications device with movement structures that are human-like, the head part preferably is capable of being articulated in a rotating manner around a vertical axis and around a horizontal axis for conducting a pitch movement by turning on the base body.

The arms preferably are capable of being articulated in a rotatable manner at a joint (shoulder joint) to the base body. A hand part capable of being articulated in a turnable manner on the arm also may be included. Each hand part can have at least two gripping pieces which are capable of being moved relative to one another in order to exercise a clamping motion.

The leg parts also preferably are capable of being articulated in a rotatable manner in the lower region of the base body. In one embodiment, the doll may be constructed to walk like a human. For this purpose, equilibrium sensors must be integrated into the controls of the doll. The doll may be capable of executing crawling movements by means of its rotatable arms and legs, and can move through space based on its introduced motion signals without being held by a person. Alternatively, feet may be provided under the legs of the doll. The feet may be equipped with rollers attached in a moveable and rotatable manner to the doll, thereby allowing the doll to move on a planar surface.

In a preferred embodiment of the present communications device, an indicator surface for letters and numbers is included. In a particularly preferred embodiment, this indicator surface is interactive, e.g., coupled with a sensor surface, which determines contact of an indicator device with a specific point on this surface. For example, one can produce letters on the indicator surface by writing on the sensor surface with the indicator device. A suitable character recognition program such as OCR (optical character recognition), may be used so that the handwriting can be converted into digital text data. In this embodiment, the sensor surface is joined with a signal processor and a data memory of the communications device. In this way, the data input and data output can be produced by contacting the sensor surface at suitable places, indicated by symbols on the indicator surface. Text or connection numbers of selected other communications devices may be stored by manual text input and assigned to arbitrary graphic symbols. By contacting a region of the indicator surface on which the graphic symbol is represented, or by repeated input of the symbol, a subscriber's number can be called up for making a specific communications connection (e.g., rapid or speed dialing).

The communications module for the data exchange may be connected to a conventional digital data connection (e.g., an ISDN connection). Alternatively, the communications module may encompass a transmission/receiving component, which makes possible connection with radio signals of a radio data network. The communications device of the invention further may encompass a reading device or read/write device for a digital data storage medium, particularly a chip card or magnetic stripe card. In this way, the versatility of the communications device is increased, and information read off a bank card or credit card, for example, may be used for electronic payment procedures over the data network. Also, other reading or read/write devices may be included, e.g., for diskettes, CD-ROMs or similar data storage media, which make possible data input from, or data exchange with, an already existing computer system without a direct connection over the data network.

Additional features and advantages of the invention result from the following description of the drawings.

BRIEF DESCRIPTION OF THE DRAWINGS

FIG. 1 shows a front view of a communications device according to the invention;

FIG. 2 shows a partial view of the upper segment of the communications device in front view, in which the possible movements of the arm part are represented;

FIG. 3 shows a front view of the arm part;

FIG. 4 shows a side view of the communications device, in which the possible movements of the leg part are represented;

FIG. 5 shows a side view of the communications device, in which the possible movements of the arm part are represented;

FIGS. 6 and 7 show front views of a segment of the arm part, in which possible movements of the hand part are represented;

FIG. 8 shows a side view of the head part;

FIG. 9 shows a top view onto the head part; and

FIG. 10 shows a back view of the communications device according to the invention.

DETAILED DESCRIPTION OF THE INVENTION

The communications device according to the invention shown in the drawings comprises a base unit 1, on whose upper segment a head part 2 is articulated in a moveable manner. Head part 2, whose face surface is formed as a curved surface, preferably can be turned in a pitch movement (FIG. 8). In a preferred embodiment, the turning angle toward the top amounts to approximately 30°, and toward the bottom, approximately 15°, although any desired angle may be employed. Head part 2 preferably can be rotated to the left and right around its vertical axis by about 90° each time, as shown in FIG. 9.

Head part 2 has an eye window 3, in which the display screen is arranged. Preferably, the display screen is arranged inside head part 2, whereby the represented image is reflected toward the outside via partially reflecting mirror surfaces in the region of eye window 3. At least one camera is preferably arranged behind the partially reflecting mirror surface. In addition, head part 2 may contain a mouth window 4, in which a speaker is arranged.

On the front surface of base unit 1, an indicator surface 5 can be seen, with which, for example, numbers and letters can be represented. Preferably, indicator surface 5 is formed by an LCD matrix or by a TFT (transistor fine technology) image screen. In front of indicator surface 5, an invisible sensor surface is arranged, which detects, for example, the contact of a tip of a recording pen. In this way, a data input can be produced by contacting a region of indicator surface 5, in which a particular symbol is shown. In addition, numbers or letters can be traced onto indicator surface 5, which are recognizable by a character recognition program (OCR software). The commands or data input with the sensor surface via indicator surface 5 are processed by a processor arranged in the communications device and used for control of the communications device, for example, for selecting a subscriber's number for a communication partner.

As shown in FIGS. 2 and 5, two arm parts 6 are disposed on the sides of base body 1. The arm parts 6 are capable of being articulated on base body 1 in a freely rotatable manner at the upper end. At the ends of arm part 6 hand parts 7,7',7" preferably are disposed. Hand part 7 may be provided, for example, with segments 8 that can be moved around a specific angular region (FIG. 3). Alternatively, segments 8' may be configured so that they turn relative to one another (FIG. 6). These two forms of embodiment 7,7',7" of the hand part may be used for gripping or clamping objects.

FIG. 7 shows another form of embodiment of hand part 7, which does not have clamping segments present. Alternatively, the entire hand part can be turned around an angle of±approximately 15°. Other possibilities for rotating or turning can be provided depending on the application purpose of hand part 7,7',7".

Two leg parts 9 are capable of being articulated so that they can be turned next to each other at the lower end of base body 1, and are connected by another joint with two foot parts 10. The possible movements of leg parts 9 and foot parts 10 are shown in FIG. 4. It can be seen that the communications device represented will not be capable of walking on leg parts 9 with foot parts 10. However, it will be possible to conduct a crawling motion, with which the communications device can move in space. In particular, it can be seen from FIG. 5 that hand parts 7 reach somewhat lower than the articulation point for leg parts 9. If leg parts 9 with foot parts 10 are worked completely to the front, the communications device will support itself with a circular motion of arm parts 6 on hand parts 7 and slowly move over a planar surface.

All moving parts 2, 6, 7, 8, 9, and 10 can be driven by one or more motors, and preferably are provided with motion sensors which detect an adjustment motion of one of the moving parts. The motor drive can be controlled, for example, by microprocessors arranged in the communications device. The microprocessors also can detect the movement signals of the adjusting motions and transmit these as control signals to a data network. For communication with a second communications device, these control signals are transmitted to the microprocessor of the second device, which controls the drive motors for the moving parts of the second device relative to a corresponding adjustment motion. Since the operating person imagines himself inside the communications device when viewing the communications device, particularly the display screen in eye window 3 on the front side, it is meaningful to utilize control signals from the moving parts applied on the right side of the communications device for controlling the left-side moving parts of the second communications device controlled via the data network. Thus, if the operating person adjusts one of the moving parts with the right arm, a moving part on the right side is actuated in the case of another communications device receiving the signal.

If the display screens, on the other hand, are located on the back side of the head, the operating person has the impression of seeing through the communications device and the left side of the imaging communications device agrees with the left side of the operating person, who views the display screen.

FIG. 10 shows the back side of a communications device according to the invention, on which connection sockets 11 are arranged for contact plugs of signal lines 12. These signal lines 12 may be guided directly to a data network (e.g., a public telephone network or digital data network ISDN). Alternatively, a second communications device can be directly connected via a data line with the first communications device. In this way, several communications devices can also be connected to one connection of a data network.

EQUIVALENTS

Those skilled in the art will recognize, or be able to ascertain many equivalents to the specific embodiments described herein. Such equivalents are intended to be encompassed within the scope of the following claims.

What is claimed is:

1. A communications device comprising:
   (i) at least one microphone;
   (ii) at least one speaker;
   (iii) a communications module for exchange of data with a digital data network having a data line;
   (iv) a base body having connected thereto at least one moving part;
   (v) at least one adjusting motor capable of moving the moving part;
   (vi) a control device capable of receiving control signals from the data network over the communications module and of controlling the adjusting motor; and
   (vi) a motion sensor adapted to detect a manual adjustment movement of the moving part and capable of transmitting control signals representing the detected movement to the data network via the data line.

2. The communications device according to claim 1 further comprising at least one camera and at least one display screen.

3. The communications device according to claim 2, wherein a central point of the surface of the display screen is projected onto the optical axis of the camera by means of a partially reflecting mirror.

4. The communications device according to claim 1 wherein the microphone and speaker comprise a single unitary component with a vibrating diaphragm.

5. The communications device according to claim 1, comprising at least two microphones and at least two speakers, which are disposed laterally on the base body.

6. The communications device according to claim 1, further comprising at least two cameras and at least two display screens which are disposed next to one another.

7. The communications device according to claim 1 comprising the following moving parts:
   a) a head part disposed on top of the base body,
   b) two arm parts disposed laterally to the base body; and
   c) two leg parts disposed next to one another on a lower part of the base body.

8. The communications device according to claim 7, wherein the head part can be rotated around a vertical axis and can be articulated so that it can be turned on base body in a pitch motion.

9. The communications device according to claim 7, wherein each arm part can be articulated in a rotatable manner around an axis on base body.

10. The communications device according to claim 9, further comprising a hand part disposed at an end of the arm part.

11. The communications device according to claim 10, wherein the hand part further comprises at least two gripping segments which are capable of being articulated.

12. The communications device according claim 7, wherein each leg part is capable of being articulated in a rotatable manner around an axis on the base body.

13. The communications device according to claim 12, wherein the leg part further comprises a foot part capable of being articulated so that it can be turned.

14. The communications device according to claim 7, wherein the speaker is arranged in a mouth window in a lower half of a front side of the head part.

15. The communications device according to claim 7, wherein a microphone and speaker are disposed on each side of the head part.

16. The communications device according to claim 7, where in a display screen or a mirror reflecting the display screen and a camera are arranged in an eye window on a front side of an upper half of the head part.

17. The communications device according to claim 7, wherein a display screen or a mirror reflecting the display screen and a camera are arranged on a back side of the head part.

18. The communications device according to claim 1 further comprising an indicator surface for indicating graphic representations.

19. The communications device of claim 1, further comprising a sensor surface capable of determining a contact with a specific point of the sensor surface and the coordinates of the contacted point.

20. The communications device according to claim 1, wherein the communications module comprises a connection socket capable of receiving a plug of a connection cable for connection to the digital data network.

21. The communications device according to claim 1, wherein the communications module for data exchange with the digital data network comprises a transmitting and receiving unit for radio signals.

22. The communications device according to claim 1, wherein the motion sensor comprises an incremental angular measurement sensor, capable of measuring the turning or rotating motion around the joint axis of a moving member.

23. The communications device according to claim 1, wherein the motor comprises a d.c. servomotor or step motor.

24. The communications device according to claim 1, further comprising a step-down gear disposed between the motor and moving part.

25. The communications device according to claim 1, further comprising a signal processor (CPU) and at least one data storage device.

26. The communications device according to claim 1, further comprising a reading or read/write means for a digital data storage medium.

27. The communications device of claim 26, wherein the reading or read/write means comprises a chip card or a magnetic stripe card.

* * * * *